No. 889,715. PATENTED JUNE 2, 1908.
E. D. PEERSTONE.
TROLLEY.
APPLICATION FILED DEC. 7, 1907.
2 SHEETS—SHEET 1.
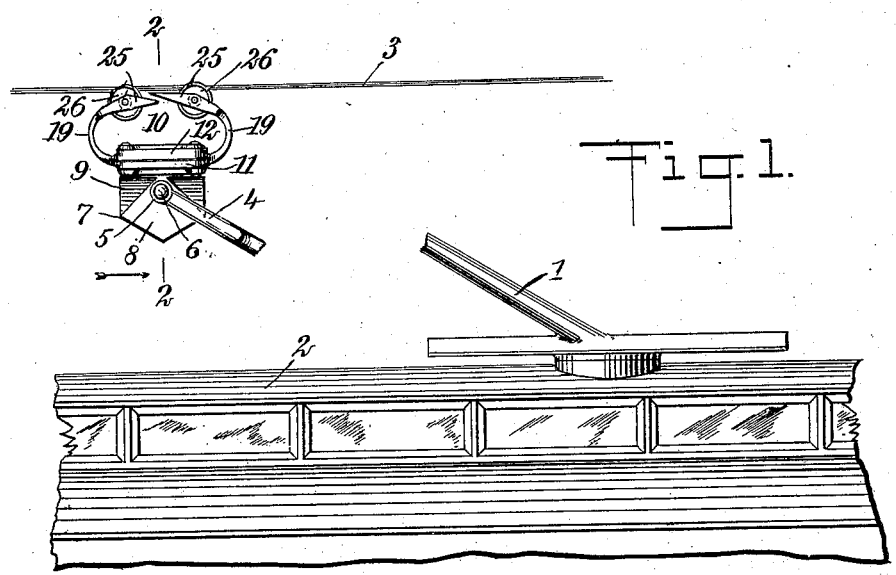
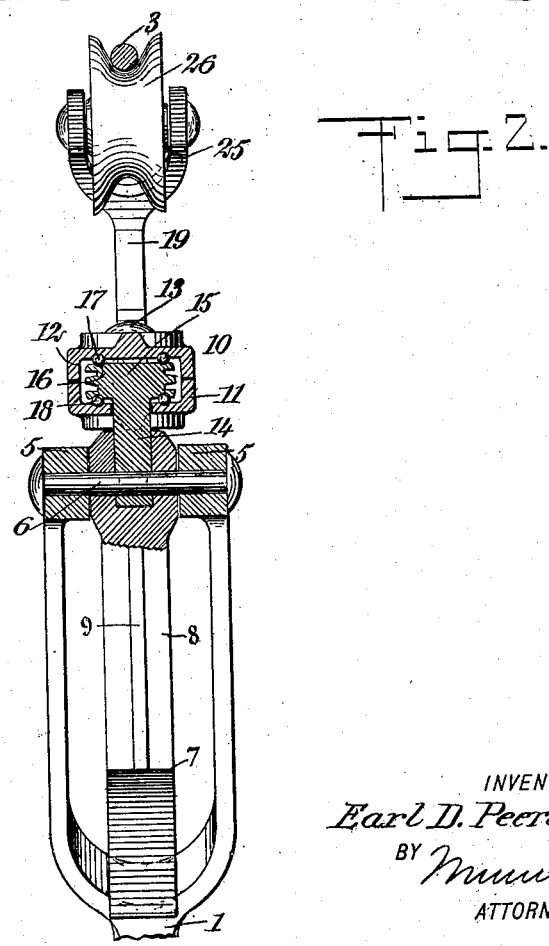
WITNESSES
INVENTOR
Earl D. Peerstone
BY
ATTORNEYS No. 889,715. PATENTED JUNE 2, 1908.
E. D. PEERSTONE.
TROLLEY.
APPLICATION FILED DEC. 7, 1907.

2 SHEETS—SHEET 2.

WITNESSES
Ben. Joffe
John R. Brachvogel

INVENTOR
Earl D. Peerstone
BY Munn & Co.
ATTORNEYS

UNITED STATES PATENT OFFICE.

EARL D. PEERSTONE, OF CHICAGO, ILLINOIS.

TROLLEY.

No. 889,715.  Specification of Letters Patent.  Patented June 2, 1908.

Application filed December 7, 1907. Serial No. 405,528.

*To all whom it may concern:*

Be it known that I, EARL D. PEERSTONE, a citizen of the United States, and a resident of Chicago, in the county of Cook and State of Illinois, have invented a new and Improved Trolley, of which the following is a full, clear, and exact description.

This invention relates to trolleys, and is particularly useful in connection with electric railways and the like.

An object of the invention is to provide a simple, strong and durable trolley which is so constructed that the trolley wheels cannot easily become disengaged by accident, from the trolley wire, and which maintains a constant and effective electrical contact with the trolley wire.

A further object of the invention is to provide a device of the class described, in which the trolley wheels are automatically guided from one trolley wire to a branch wire when the car passes from one track to a branch track, and which, in case it is freed from the trolley wire, cannot be injured by accidental engagement with a cross or supporting wire of the trolley wire.

The invention consists in the construction and combination of parts to be more fully described hereinafter and particularly set forth in the claims.

Figure 3:
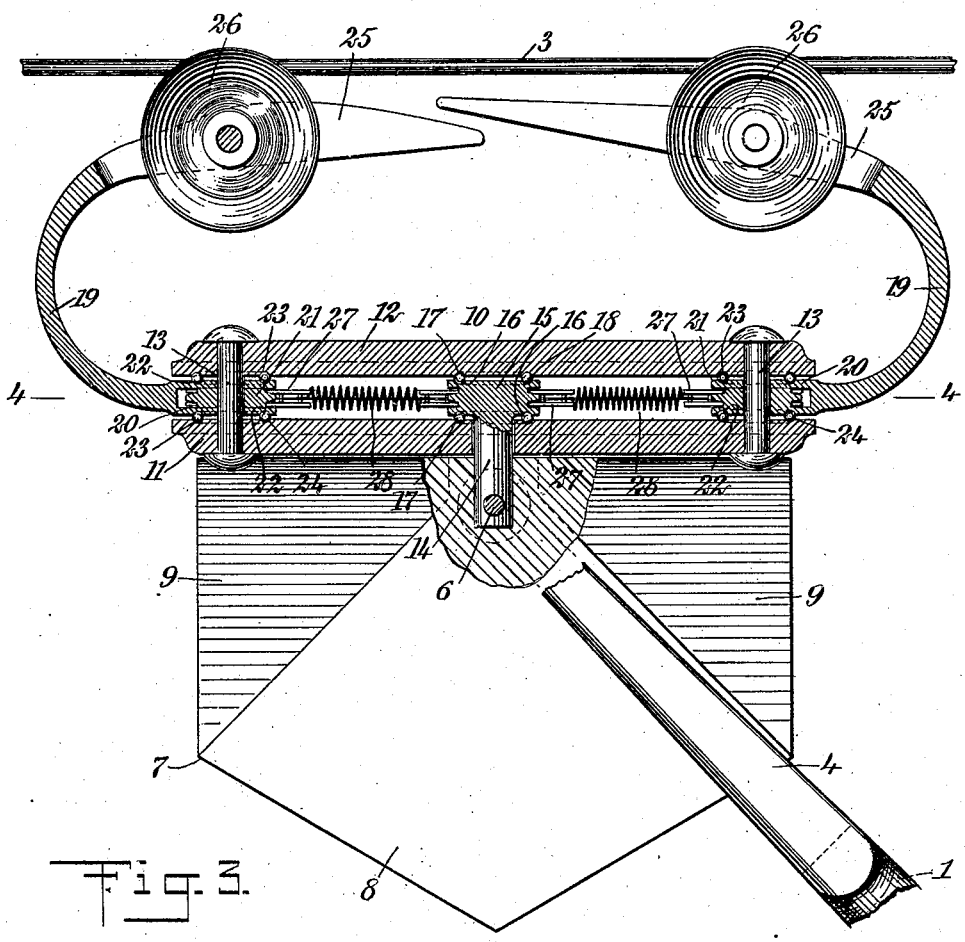
Figure 4:
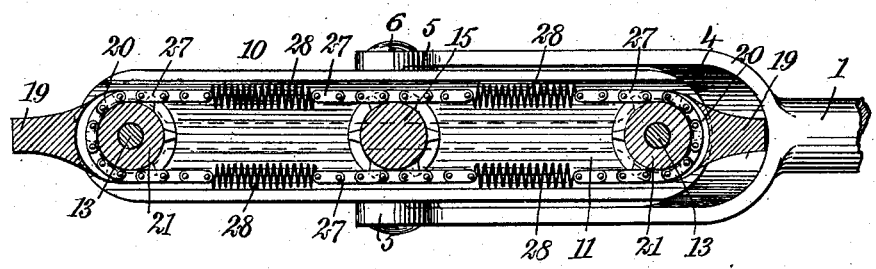

Reference is to be had to the accompanying drawings forming a part of this specification, in which similar characters of reference indicate corresponding parts in all the figures, and in which Figure 1 represents a portion of an electric car having my invention applied thereto, and showing parts broken away; Fig. 2 is an enlarged transverse section on the line 2—2 of Fig. 1. Fig. 3 is an enlarged longitudinal section of the trolley, showing parts broken away, and Fig. 4 is a longitudinal section on the line 4—4 of Fig. 3.

Referring more particularly to the drawings, I provide a trolley pole 1, which, with the exception of certain details of construction, may be of any preferred or common form, and which, further, may be mounted upon the car 2 in any suitable manner. The trolley pole 1 extends upwardly from the car roof to the trolley wire 3, preferably at an acute angle to the horizontal in the usual manner. The upper end 4 of the pole, that is, the end remote from the car, is bifurcated and has the extremities formed into eyes 5, between which is arranged a pivot bolt or rivet 6. A body 7, constituting a counterbalance for certain of the parts, as will appear more clearly hereinafter, is mounted upon the pivot 6 by means of an opening provided for the purpose, and extends between the sides of the bifurcated pole end 4. The body 7 has a substantially diamond-shaped portion 8, through the upper corner of which extends the opening for the pivot 6. At the upper sides of the portion 8 are similar flanges 9, the thickness of which is considerably less than that of the portion 8, with which they are integral. Owing to this construction, the center of gravity of the body 7 is located nearer the lower edge than the upper edge thereof, and is a considerable distance below the pivotal point at which the body is suspended. The flanges 9 act as guards, as will appear more clearly hereinafter.

A frame 10 is arranged upon the body 7, and comprises a lower channel-shaped frame member 11 and a correspondingly formed upper member 12. Near the opposite ends, the frame members are firmly secured together by means of rivets or bolts 13, which extend through suitable openings provided in the frame members for the purpose. At the upper edges, the flanges 9 of the counterbalancing body 7 are cut away to receive the heads of the rivets or bolts 13, as is shown most clearly in Fig. 3. A post 14 is arranged in an opening of the lower frame member 11, and extends into a registering recess of the body 7. The post 14 has a transverse opening therethrough which receives the rivet 6, so that the post is secured to the body 7 and the trolley pole. The body 7 is free to swing about its pivot 6 in the plane of the trolley pole. The frame 10 is free to swing about its pivotal post in a plane at substantially right angles to the plane of the body 7.

The post 14 has a head 15 constituting a sprocket wheel, and having formed at the opposite faces thereof ball races 16. The upper and lower frame members have corresponding ball races 17, which, together with the races 16, receive ball bearings 18.

I employ substantially U-shaped arms 19, each having an end formed into a socket 20. Within each socket 20 is rigidly carried a sprocket wheel 21. At the opposite faces of the sockets 20 are formed ball races 22. Corresponding ball races 23 are formed upon the upper and lower frame members, and, together with the races 22, receive ball bearings 24. The rivets 13 extend through suitable openings of the sockets 20 and the sprocket wheels 21, and serve as spindles for the latter. At the same time, the rivets serve pivotally to secure the arms 19 upon the frame.

The free ends 25 of the arms 19 are bifurcated, and have mounted therebetween trolley wheels 26, which may be of any preferred or common form. The ends 25 of the arms are extended and normally overlap, constituting guards to prevent the passing of a cross wire or other obstruction underneath the trolley wheels or arms.

Chains 27 are arranged in operative engagement with the sprockets 15 and 21. The adjacent ends of the chains 27 are joined by means of helical springs 28, the arrangement being such that a pair of helical springs is located between the sprocket 15 and each of the sprockets 21.

By employing a plurality of trolley wheels, it is possible to maintain the electrical connection between the car and the trolley wire uninterrupted, for, while one wheel passes a break in the wire, the other wheel is still in contact with the same. The counter-balancing body 7 maintains the arms 19 which carry the trolley wheels, in a normal operative position, that is, projecting upwardly toward the trolley wire. The arms 19 are operatively connected by means of the chains 27 and the springs 28, but the latter will yield, so that the arms can move independently of one another. This feature is of great advantage in rounding curves or when irregularities are encountered in the trolley wire. When these two conditions obtain, the trolleys adjust themselves to the wire, independently of one another. At the same time, in passing a crossing or a break in the trolley wire, the connecting means serve to hold the trolley wheels substantially parallel, and prevent the displacement of the wheel momentarily out of engagement with the trolley wire. Furthermore, in shifting the trolley pole, the trolley wheels cannot become displaced, as they are operatively connected one with the other and with the trolley pole through the post 14.

In case the trolley becomes momentarily disengaged from the trolley wire, the guards 25 prevent the cross wires or the like from slipping underneath the arms 19 and injuring the trolley. Furthermore, should the pole swing upward and strike a cross wire, the latter would ride along the pole until it engaged the body 7, and would then slide along the guard 9 until the frame 10 was reached. This would cause the entire device to revolve about its pivot 6, thereby instantly releasing the cross-wire.

In passing from one track to a branch track, it is unnecessary with my device to shift the trolley from one wire to the branch wire manually or in any other manner. My trolley automatically shifts from one wire to the other, following the direction of the movement of the car. This is due to the fact that the car begins to turn before the trolley reaches the branch wire; the consequent twist given to the trolley pole by the movement of the car is transmitted to the arms 19 through the springs and chains. The wheels, however, remain in engagement with the trolley wire, so that the springs 28 take up the twist of the trolley pole, the springs at one side being extended, while those at the other are compressed. Consequently, when the first trolley wheel reaches the branching wire, the springs automatically direct it upon the branch wire.

Having thus described my invention, I claim as new and desire to secure by Letters Patent

1. In a trolley, a pole, a plurality of wheels carried by said pole, and guards, each arranged adjacent to one of said wheels and extending toward the other, said guards being normally out of engagement and overlapping.

2. In a trolley, a pole, a frame mounted to swing upon said pole and having a plurality of trolley wheels, said wheels being movable independently of one another and being mounted to swing transversely of the plane of said pole, said frame being arranged to swing in the plane of said pole, a counterbalance for holding said frame in a normal position, and guards carried by said frame and each adjacent to one of said wheels, said guards extending toward a point intermediate said wheels and overlapping.

3. In a trolley, a pole, a frame mounted upon said pole, a plurality of wheels carried by said frame, and guards for said wheels, said wheels and said frame being independently movable, said guards being normally out of engagement with each other and overlapping.

4. In a trolley, a pole, a frame mounted to swing upon said pole in the plane of the same, a plurality of wheels carried by said frame at separated points thereof and bodily movable with respect to each other, means for resisting the movement of each of said wheels, means for holding said frame in a normal position, and guards mounted upon said frame adjacent to each of said wheels, said guards being positioned intermediate said wheels and below the tops thereof.

5. In a trolley, a pole, a plurality of wheels carried by said pole, and means for operatively connecting said wheels whereby one controls the other, said pole having means for operating said connecting means whereby said pole controls said wheels.

6. In a trolley, a pole, a frame mounted to swing upon said pole in the plane of the same, a plurality of wheels carried by said frame and bodily movable with respect to each other, said wheels normally rotating in the same plane, and resilient means for operatively connecting said wheels whereby the same normally move together bodily, said resilient means permitting the movement of each of said wheels independently of the other when the resilient resistance is overcome, said pole having means for operating said connecting means whereby said pole controls said wheels.

7. In a trolley, a pole, a frame mounted to swing upon said pole in the plane of the latter, arms pivoted upon said frame and carrying wheels, said arms having overlapping guards, means for operatively connecting said arms, said connecting means having a resilient portion, and a counterbalance for maintaining said frame in a normal position with said arms extending upwardly.

8. In a trolley, a pole, a frame mounted to swing upon said pole, current-collecting members carried by said frame and pivotally movable with respect to one another, and means for operatively connecting said members and said pole whereby said pole controls said members, and each of said members controls the other of said members.

9. In a trolley, a pole, a frame mounted to swing upon said pole, arms carried by said frame and movable with respect thereto, wheels mounted to rotate upon said arms, means for operatively connecting said arms and said pole, whereby said pole controls said arms, said connecting means being extensible, and means for holding said frame in a normal position.

10. In a trolley, a pole, a frame mounted to swing upon said pole, arms pivotally mounted upon said frame, wheels carried by said arms, means for operatively connecting said arms, said connecting means being controlled by said pole, whereby said pole controls said arms, said connecting means being resiliently extensible, and a counterbalance for holding said frame in a normal position.

11. In a trolley, a pole, a frame pivotally mounted upon said pole, arms pivotally carried by said frame, a member carried by said frame and operatively connected with said pole, resiliently extensible means engaging said arms and said member, and a counterbalance for holding said frame in a normal position.

12. In a trolley, a pole, a counter-balance pivotally carried by said pole, a frame arranged upon said counterbalance, a member within said frame and rigidly secured to said counterbalance and said pole, arms pivotally carried by said frame and having sprockets rigid therewith, said member having a sprocket rigid therewith, trolley wheels carried by said arms, said arms having guards, flexible members engaging said sprockets, and resilient members connecting the adjacent ends of said flexible members.

In testimony whereof I have signed my name to this specification in the presence of two subscribing witnesses.

EARL D. PEERSTONE.

Witnesses:
G. E. WITTEMAN,
J. P. FORAKER.